United States Patent
McCullough et al.

[11] 3,975,735
[45] Aug. 17, 1976

[54] DISCHARGE PIPE LINE LOCATOR

[76] Inventors: Lester E. McCullough, 1851 W. Mountain, Glendale, Calif. 91201; Richard E. Taylor, 8460 Cole Crest Drive, Hollywood, Calif. 95234

[22] Filed: Sept. 19, 1974

[21] Appl. No.: 507,334

[52] U.S. Cl. ............................... 343/112 R; 324/3; 324/67
[51] Int. Cl.² ...................... G01S 3/02; G01V 3/00; G01R 19/00
[58] Field of Search ...... 340/18 NC, 18 FM, 18 LD; 324/3, 67; 175/26, 45; 325/119; 343/112 R; 331/47

[56] References Cited
UNITED STATES PATENTS

| | | | |
|---|---|---|---|
| 2,601,248 | 6/1952 | Brenholdt | 324/67 |
| 2,908,863 | 10/1959 | Neff | 324/67 |
| 3,518,558 | 6/1970 | Miller et al. | 307/261 |
| 3,597,680 | 8/1971 | Haddon | 324/3 |
| 3,704,413 | 11/1972 | Blevins | 324/67 |
| 3,718,930 | 2/1973 | McCullough et al. | 343/112 D |
| 3,831,138 | 8/1974 | Rammner | 340/18 NC |
| 3,893,025 | 7/1975 | Humphreys, Jr. | 324/67 |

*Primary Examiner*—Maynard R. Wilbur
*Assistant Examiner*—T. M. Blum
*Attorney, Agent, or Firm*—Subkow and Kriegel

[57] ABSTRACT

An electronic locator for tracing the course of a metallic discharge line which is disposed underground. A reel means stores a length of flexible hollow cable and is operable when rotated to advance the free end of the cable into the metallic discharge line. Conductors extending through the cable provide for electrically connecting an audio frequency signal generator located on the reel means to a transmitter antenna attached to the free end of the cable. A directional receiver means determines the location of the discharge line by detecting the high strength, varying frequency signals generated by the audio frequency signal generator and radiated by the transmitter antenna through the walls of the metallic discharge line.

16 Claims, 15 Drawing Figures

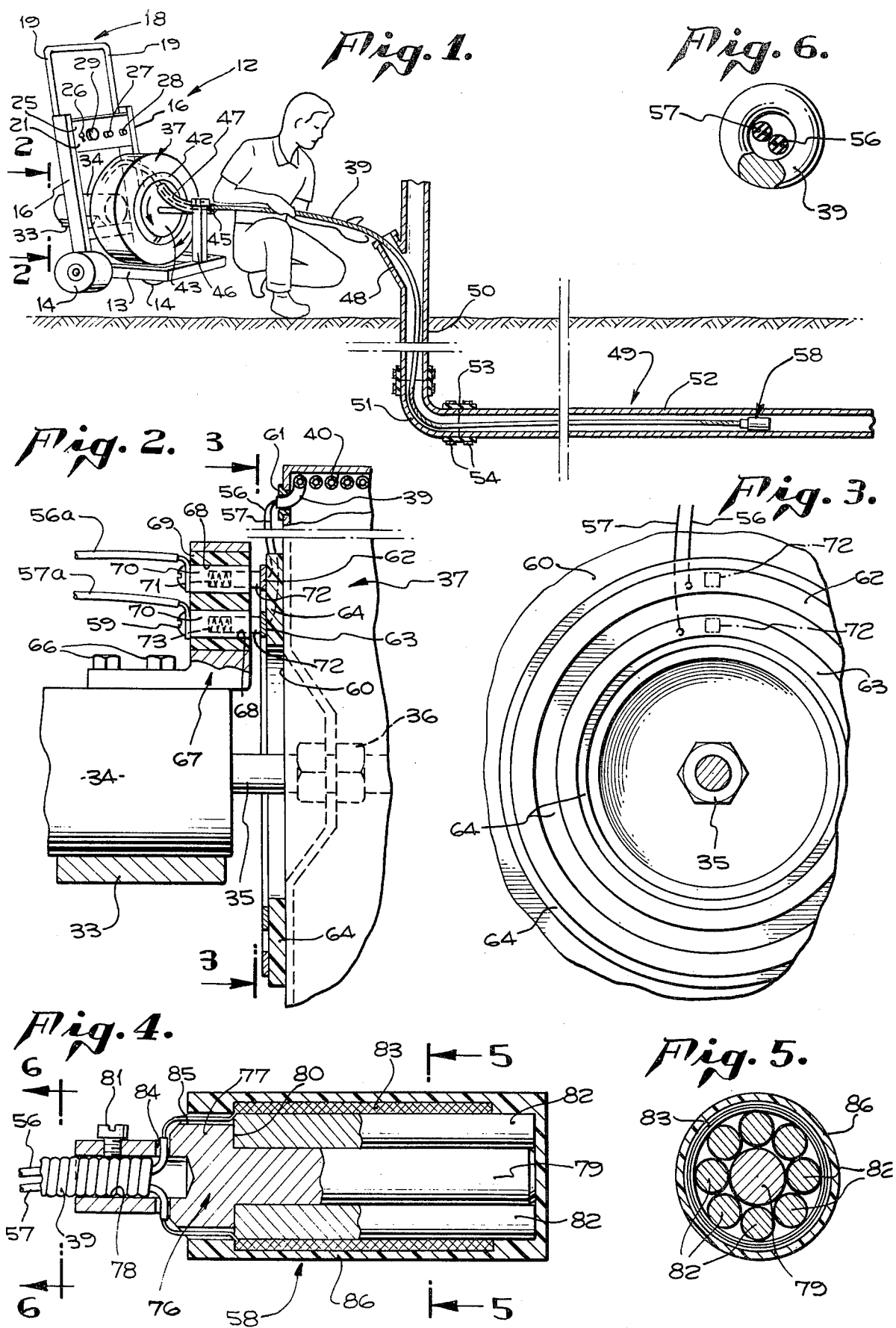

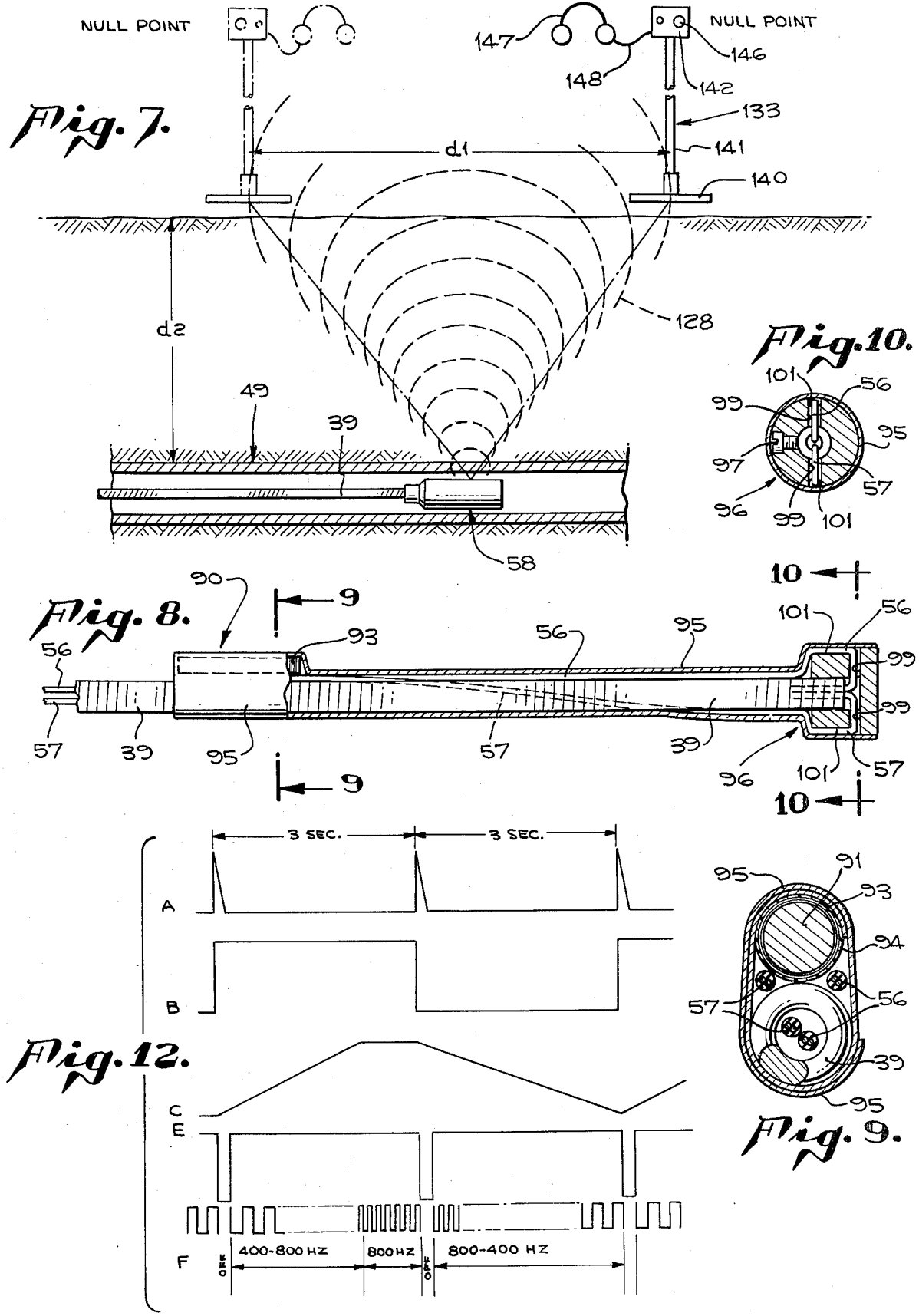

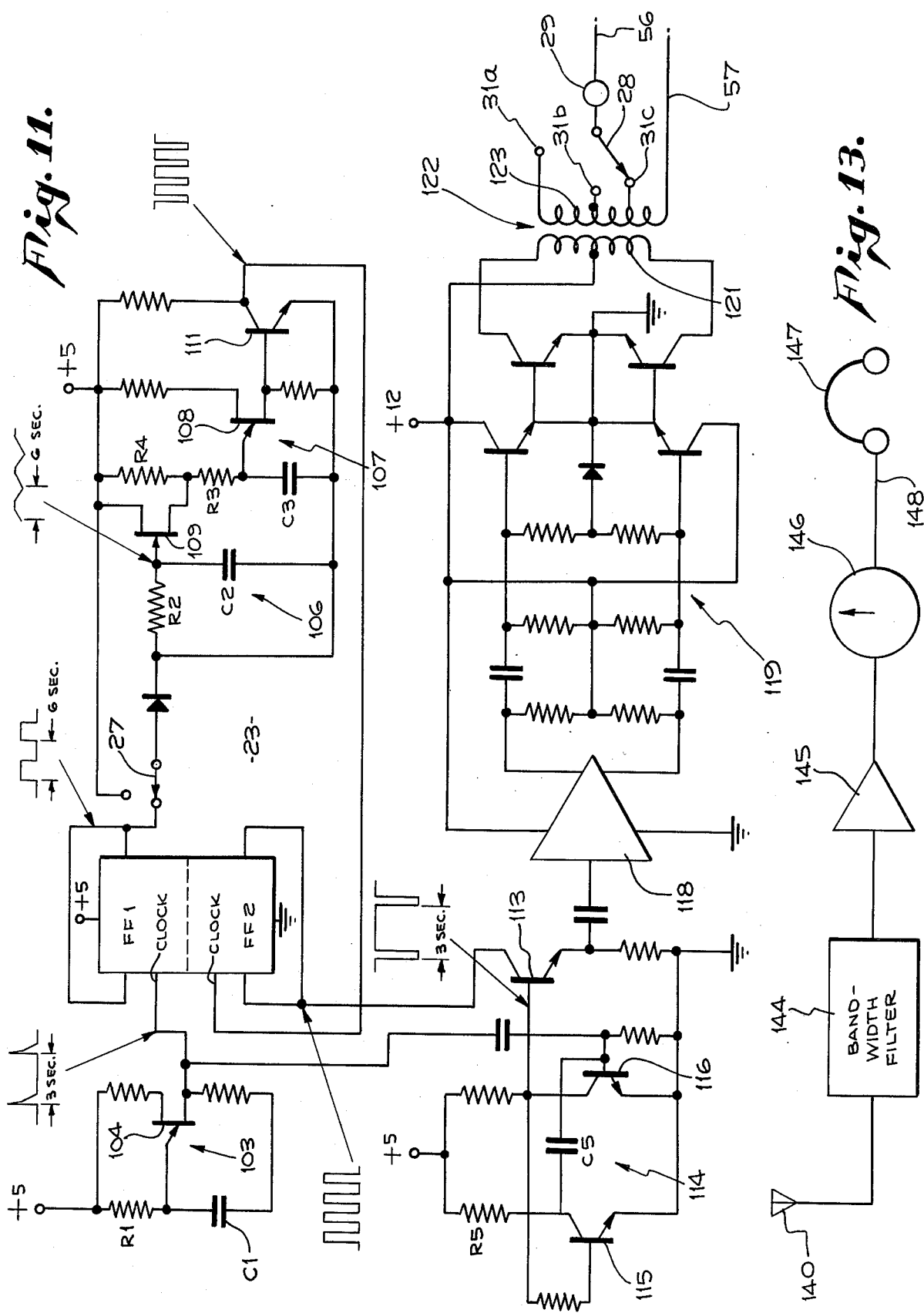

DISCHARGE PIPE LINE LOCATOR

This invention relates to apparatus for locating pipe lines which are disposed below ground and, more particularly, to improvements in electronic locators for locating and tracing such pipe lines when formed of metal.

With the increasing interest in ecology, there is a need for sanitation districts to develop a source control program for industrial waste. In order to do so, it is necessary to know the specific constituents of the waste being discharged into the main sewer line by a particular industry. In this way it can be determined what degree of pretreatment must be provided by the industry before its waste can be discharged into the sewer system. The problem with carrying out such a program is that many industries do not know or have any records showing where their lines discharge into the main sewer line or even where they come out of the building. Furthermore, although the main sewer lines located out in the street are usually formed of nonmetallic material such as clay pipes, the discharge lines located under a building and which lead from the building toward the main sewer line are usually metallic, such as cast iron, in order to meet the requirements of the building code. Thus, although electronic locators which operate to broadcast high frequency radio waves, on the order of 150 to 450 kc, have been used heretofore to locate nonmetallic sewer lines, such locators are ineffective in the locating or tracing of metallic sewer lines. The reason such prior art locators are ineffective is because of the shield effect of the metal walls of the pipe line which act to prevent the high frequency signals from being broadcast so as to be detectable above ground.

Accordingly, therefore, one of the objects of the present invention is directed to the provision of apparatus for locating and tracing the course of metallic discharge or drain lines which are disposed below ground.

Another object of the invention is to provide a novel audio frequency signal generator and emitting device for accurately locating and tracing the course of a metallic discharge line.

Another object of the invention is to provide a metallic discharge line locator which can be reliably operated by unskilled personnel.

Still another object of the present invention is to provide an electronic metal pipe locator that effectively operates to transmit and receive periodically interrupted, readily identifiable audio frequency signals varying in the range of 400--800 cycles per second.

With these and other objects in view, the invention consists of the construction, arrangement and combination of the various parts of the device whereby the objects contemplated are obtained, as hereinafter set forth, pointed out in the appended claims, and illustrated in the accompanying drawings.

In the drawings:

FIG. 1 illustrates the apparatus of the present invention in position for use in locating a metallic discharge pipe line which is disposed underground;

FIG. 2 is a side view portion of the reel drive as taken along the line 2—2 in FIG. 1;

FIG. 3 is a rear view of the reel housing as taken along the line 3—3 of FIG. 2;

FIG. 4 is a longitudinal sectional view of the transmitter antenna;

FIG. 5 is a cross-sectional view of the transmitter antenna as taken along the line 5—5 of FIG. 4;

FIG. 6 is a cross-sectional view of the cable as taken along the line 6—6 of FIG. 4;

Figure 15:
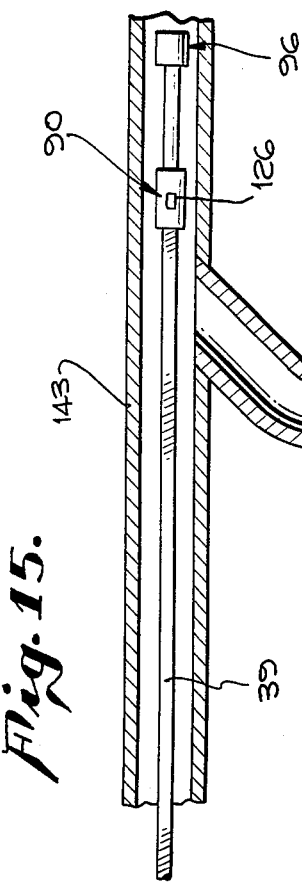
Figure 14:
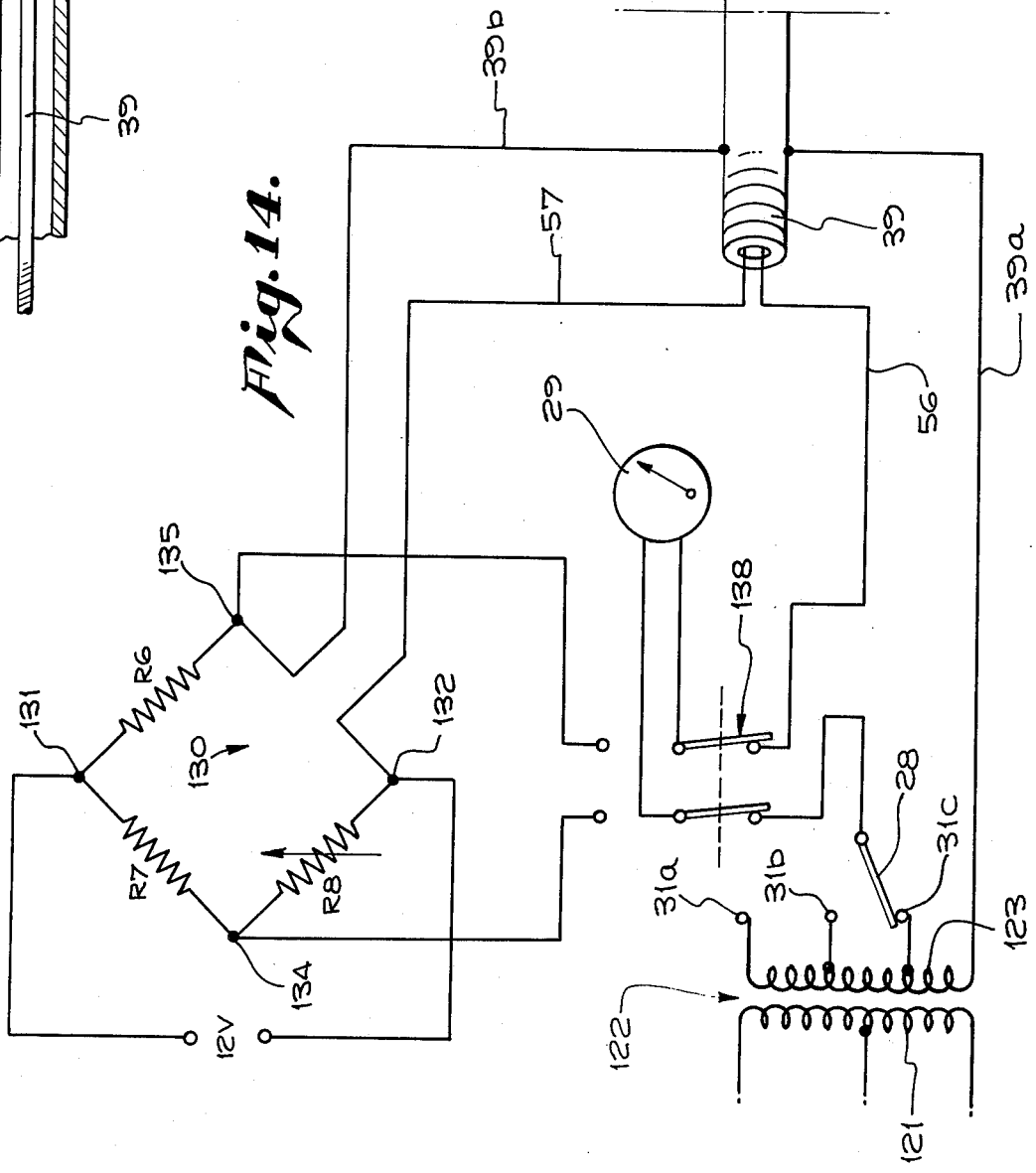

FIG. 7 diagrammatically illustrates the electromagnetic radiation pattern emitted by the transmitter antenna being sensed by the receiver antenna;

FIG. 8 is a view of an alternate embodiment of a transmitter antenna disposed on the end of the cable;

FIG. 9 is a cross-sectional view as taken along the line 9—9 of FIG. 8;

FIG. 10 is a cross-sectional view as taken along the line 10—10 of FIG. 8;

FIG. 11 is a schematic electrical circuit diagram of the audio frequency signal generating circuit;

FIG. 12 illustrates waveforms at different points of the electrical circuit in FIG. 11;

FIG. 13 is a schematic block diagram of the receiver circuit;

FIG. 14 is a schematic circuit diagram of a modified embodiment of the electrical circuit associated with the transmitter antenna of FIG. 8 which includes a thermistor; and FIG. 15 is a schematic diagram of a pipe line system showing the use of the modified embodiment of the locator apparatus in FIG. 14.

Referring to FIG. 1 of the drawings, the pipe locator apparatus of the present invention is shown to include a portable reel drive 12 having a base 13 provided with side wheels 14. Extending upwardly from the rear sides of the base 13 is a fame formed of a pair of side members 16. A U-shaped handle 18 has its arms 19 attached to the upper ends of the side members 16. Extending across the upper ends of the side members 16 and attached thereto is a box 21 which encloses an audio frequency signal generating circuit 23 (FIG. 11). The panel 25 forming the front surface of box 21 is provided with an "on off" switch 26, a mode selection switch 27, a three-position power switch 28, and a meter 29. Attached across the lower ends of the side members 16 is a shelf 33 for supporting a motor 34. Concentrically mounted on the end of shaft 35 of the motor 34 and held thereon by a nut 36 is a rotable reel housing 37. The reel housing 37 has a length of flexible hollow cable 39 coiled about its inner peripheral wall 40. Concentrically disposed within a central opening 42 of the reel housing 37 is an inner drum 43. The inner drum 43 is mounted on a hollow shaft 45 which is journaled on the end of a post 46 provided on the front end of the base 13. The inner drum 43 is thus supported to freely rotate relative to the reel housing 37. A tube 47 angularly extends from the front end of the hollow shaft 45 through the inner drum 43 and into the reel housing 37. Tube 47 acts as a guide for the withdrawing of the cable 39 stored in the reel housing 37 out through the hollow shaft 45. When the reel housing 37 is rotated by the motor 34, it imparts a twisting action to the cable 39. Then, as the cable 39 is fed into a discharge line by the operator, the inner drum 43 freely rotates on its axis reversely relative to the reel housing 37 to facilitate the uncoiling of the cable 39 from within the reel housing.

In the illustration of FIG. 1, the portable reel drive 12 is shown located adjacent the clean-out 48 of a cast iron drain or discharge line 49. The discharge line 49 includes a vertical section 50 which may extend down into the ground for as much as 12 feet where it connects to an elbow section 51 which in turn connects to a substantially horizontal section 52 that extends on towards the main portion of the sewer (not shown). The main portion of the sewer is usually formed of nonmetallic material such as clay pipe. It is noted that adjacent sections of the cast iron discharge pipe 49 such as sections 51 and 52 have their ends coupled together by rubber wrappings 53 which are held on the pipe by metal straps 54.

The hollow flexible cable 39 which is stored within the reel housing 37 provides a conduit for a pair of teflon coated wires 56 and 57. The cable 39 has a transmitter antenna 58 attached to the free outer end thereof and its inner end passes through and is attached to a ring clamp 61 on the back wall 60 of the reel housing 37. As shown in FIGS. 2 and 3, the pair of wires 56 and 57 extend inwardly along the rear wall 60 of reel housing 37. The ends of wires 56 and 57 respectively connect to a pair of slip rings 62 and 63 held on a circular flat insulating member 64 secured to the back wall 60 of the reel housing 37 so as to be concentric with the axis of rotation thereof.

Attached by bolts 66 to the upper side of the motor 34 is a bracket 67. Bracket 67 supports an insulating member 69 having a pair of spaced cylindrical openings 68 therethrough in which cylindrical conductive members 70 are secured. The conductive members 70 have bores 71 on the inner ends thereof in which brushes 72 are positioned with a sliding fit to seat against respective coil springs 73. The coil springs 73 urge the brushes 72 to have electrical contact with the slip rings 62 and 63. Wires 56a and 57a held by screws 59 on the other end of the conductive members 70 extend to the electrical circuits enclosed in the box 21 mounted on the side members 16 of the portable reel drive 12.

Referring next to FIGS. 4 and 5, the structure of the transmitter antenna 58 on the outer end of the length of cable 39 is shown to include an aluminum support 76 having an enlarged central cylindrical portion 77. Portion 77 has a cylindrical bore 78 on one end thereof and an elongated concentric smaller diameter cylindrical portion 79 on the other end thereof. The free end of cable 39 extends into the cylindrical bore 78 and is held in position therein by a set screw 81. A plurality of elongated ferrite rods 72 are positioned about and aligned with the elongated cylindrical portion 79. The ends of the ferrite rods 82 butt up against the shoulder 80 formed by the enlarged central cylindrical portion 77. A coil 83 formed of 300 turns of 24 gauge wire is wound along the length of the ferrite rods 82. The pair of teflon coated wires 56 and 57 extending from the free end of the cable 39 respectively pass through opposing radial holes 84 in the cylindrical portion 77 and then along side grooves 85 thereof to connect to the respective ends of the coil 83. The transmitter antenna 58 so formed, including the ends of the ferrite rods 82, is encapsulated in an epoxy resin 86 for strength and moisture proofing.

It should be noted that the positioning of the elongated ferrite rods 82 about the elongated cylindrical portion 79 of the aluminum support is of particular advantage inasmuch as such an arrangement provides for the torque stresses induced in the cable 39 by the reel drive 12 to be taken up by the cylindrical elongated portion 79 of the support 58 rather than by the ferrite rods 82.

An alternate embodiment of the transmitter antenna bearing reference 90 is shown in FIGS. 8, 9 and 10. In this embodiment a coil 93 having 240 turns of 24 gauge wire is wound on a single elongated ferrite rod 91. The coil 93 is covered with a coating of epoxy resin 94 and then held by electrical tape 95 against the cable 39 at a location several inches back from the free end thereof. An end cap 96 which may be formed of aluminum is positioned on the end of the cable 39 and attached thereon by a screw 97. The pair of wires 56 and 57 extending from the end of the cable 39 pass through respective opposing radial openings 99 in the end cap 96 and then along side grooves 101 so as to extend back along the cable 39 to connect to the ends of the coil 93. The electrical tape 95 used to hold the transmitter antenna 90 on the cable 39 may also be used to hold the wires 56 and 57 along the end portion of the cable. This embodiment of the transmitter antenna is highly useful inasmuch as the lead portion of the flexible cable 39 ahead of the transmitter antenna 90 permits the end of the cable to be readily bent such that it can be advanced along curved sections of the metal pipe whose course is being traced. Further, because of its small cross-section, this embodiment of the transmitter antenna is able to be inserted into small diameter pipes.

The audio frequency signal generating circuit 23 which is located in the box 21 on the reel drive 12 will next be described. Thus, as shown in FIG. 11, circuit 23 includes a first relaxation oscillator 103 including a UJT 104 having its emitter coupled to the common junction of a resistor R1 and a capacitor C1 which determines its period of oscillation. The relaxation oscillator 103 provides sharp pulses with 3 second spacing to the clock input of a first flipflop FF1. The flipflop FF1 provides for halving the frequency of the input pulses such that the square wave pulses formed on the output thereof are spaced 6 seconds apart. Depending on the setting of mode selection switch 27, the latter square wave pulses are applied to a ramp generator 106 formed of capacitor C2 and resistor R2 to provide a resulting sawtooth waveform having positive and negative slopes, as shown.

A second relaxation oscillator 107 including a UJT 108 has its emitter coupled to the common junction of a capacitor C3 and a resistor R3 which together with a series resistor R4, and a field effect transistor FET 109 in parallel therewith, determines the period of oscillation of oscillator 107. Thus, when the positive and negative slopes of the waveform from the ramp generator 106 are applied on the gate electrode of the FET 109, the overall resistance of this timing circuit varies to change the period of oscillation and thereby causes the frequency output of relaxation oscillator 107 to vary. Thus, the higher the voltage at any instant of the waveform at the gate electrode of FET 109, the higher the frequency of operation of relaxation oscillator 107. The circuit components of the timing circuit for the relaxation oscillator 107 are selected to provide for the frequency thereof to vary every 6 seconds from 800 Hz to 1600 Hz and back down to 800 Hz.

It should now be clearly understood that the ramp generator 106 together with the relaxation oscillator 107 form a voltage controlled oscillator whose frequency of oscillation is a function of the level of the voltage on the gate electrode of the FET 109 at any instant. The output square wave pulses produced by the relaxation oscillator 107, upon passing through buffer transistor 111, are fed into the clock input of a second flipflop FF2 which provides for halving the frequency of these square wave pulses such as to create output pulses which vary between 400–800 Hz. These latter pulses pass through the collector-emitter path of a gating transistor 113 during the period that the latter is open.

It should be noted that the output pulses generated by the first relaxation oscillator 103, which pulses have a period of 3 seconds, are further connected to a "one shot" multi-vibrator 114 comprising a pair of transistors 115 and 116. The output of the "one shot" multi-vibrator 114 taken from the collector of transistor 116 is connected to the base of gating transistor 113. Normally transistor 115 is conducting and transistor 116 is non-conducting such that the high voltage on the output of the "one shot" multi-vibrator 114 enables pulses on the output of flipflop FF2 to pass through gating transistor 113 to the amplifier 118. Each pulse received from the relaxation oscillator 103 causes transistor 116 to conduct. This lowers the voltage on the base of transistor 115, turning it off. The voltage is also lowered on the base of gating transistor 113 so as to cut off the flow of pulses on the collector-emitter path thereof. After a short interval, transistor 115 again conducts as a result of capacitor C5 charging through resistor R5. Thus, the flow of audio frequency pulses passing through gating transistor 113 are interrupted every 3 seconds for a short interval of time as determined by the timing of the "one shot" multi-vibrator 114.

The pulse passing through the gating transistor 113 are amplified in amplifier 118 and passed through a conventional driver circuit 119 to the primary winding 121 of a current transformer 122 whose secondary 123 is connected by the threeposition power switch 28 to the pair of wires 56 and 57 extending through the cable 49 to the transmitter antenna 58. It should be noted that the secondary winding 123 is provided with three output contacts 21a, 31b, and 31c, so that sufficient driving power, on the order of 50–75 watts, can be supplied as needed, to enable the signals transmitted by transmitter antenna 58 to penetrate the metal walls of the discharge pipe line 49. The output contact 31a, for example, supplies signals up to as much as 75 watts while the other contacts 31b, and 31c provide signals with successively lesser amounts of power.

It should be noted that the second relaxation oscillator 107 can be made to continuously supply pulses therefrom at a frequency of 1600 Hz by setting the mode selection switch 27 so as to disconnect the pulse output of the flipflop FF1 to the ramp generator 106 and, instead, connect the d.c. power supply voltage through resistor R2 to the emitter of the FET 109. Such an arrangement effectively short circuits the resistor R4 in the relaxation oscillator 107 and causes the latter to oscillate at a fixed frequency of 1600 Hz. The halving of this frequency in flipflop FF2 then provides the desired continuous 800 Hz signals to the transmitter antenna 58. In the operation of the electronic metal pipe locator of the present invention, the variable audio frequency mode of operation of the audio frequency signal generating circuit 23 is preferred since it provides a highly distinctive tone.

The time relation of the signals at different points of the audio frequency signal generating circuit 23, as repeated every 6 seconds, are shown in FIG. 12. Thus, waveform A represents the sharp pulses having a period of 3 seconds as generated by the first relaxation oscillator 103. Waveform B represents the square wave pulse output of the first flipflop FF1. Waveform C represents the sawtooth waveform with the positive and negative ramps (slopes) as generated by the ramp generator 106 in response to the waveform B. Waveform E represents the output of the "one shot" multi-vibrator 114 which controls the gating transistor 113. Waveform F represents the audio frequency signals increasing from 400 Hz up to 800 Hz over a 3 second period and then decreasing back down to 400 Hz during the following 3 second period. It should be noted that the "one shot" multi-vibrator 114 (waveform E) operates, in particular, to interrupt the transmitted audio frequency signals twice every 6 seconds. Once while the audio frequency signals are varying at a frequency of 400 Hz and, again, when the audio frequency signals are varying at a frequency of 800 Hz. This range of frequency provides tones which are pleasing to the ear and the varying audio tone together with the interruption thereof every 3 seconds results in signals that are quite distinctive such that when heard by the operator they can be readily distinguished from any spurious signals that may be received in the vicinity.

The receiver 133 and associated circuitry for detecting the audio frequency signals broadcast by the transmitter antenna 58 is schematically illustrated in FIG. 13. The directional receiver antenna 140 is constructed generally similar to the transmitter antenna 58 in that it includes a ferrite rod having a coil (not shown) thereon of approximately 5,000 turns of 32 gauge wire. The receiver antenna 140 is designed to peak at 800 Hz but has a range down to 400 Hz. As illustrated in FIG. 7, the receiver 133 has an arm 141 with the receiver antenna 140 adjustably mounted on the lower end thereof. A housing 142 on the upper end of arm 141 includes the circuit shown in FIG. 13, namely, a band width filter 144, an amplifier 145, a meter 146 and a connector 148 for a pair of headphones 147. The voltages impressed upon the receiver antenna 140 include undesirable signals produced by power transmission lines in the area, particularly 60 cycle signals and harmonics thereof, which signals are eliminated by the band width filter 144.

In order to detect the location of a metallic discharge pipe line 49 with the present locator apparatus, the mode selection switch 27 on panel 25 of box 21 is preferably set for variable frequency operation. The free end of the cable 39 with the transmitter antenna 58 connected thereto is then inserted into the clean-out 48 of the metal discharge pipe line 49 to be traced. The motor 34 is then switched on causing the cable 39 with the transmitter antenna 58 on the free end thereof to slowly twist at approximately 100 rpm. The operator then manually feeds the cable 39 with the transmitter antenna 58 attached on the end thereof down into the metal discharge pipe line 49. The rotating of the helical metal sheathing of the cable 39 assists in the advancement thereof along the discharge line. It should be noted that the teflon coating on the wires 56 and 57 is useful in protecting them since they tend to twist in the cable 39 and rub and wear relative to each other independently of the twist of the cable itself.

After the cable 39 has been inserted for a length of, for example, 10 feet, the operator can determine the exact underground location of the transmitter antenna 58 by switching on the "on off" switch 26 of the audio frequency signal generating circuit 23 in the box 21. This causes the electromagnetic signal waves 128 oscillating at frequencies between 400–800 Hz in transmitter antenna 58 to be radiated above ground. Depending on the depth of the metallic discharge line 49 below ground sufficient wattage is provided by the setting of the power selection switch 27 to cause the signals to penetrate the wall of the metallic discharge line 49 such that they can be detected by the receiver antenna 140 being moved about the ground above the possible path of the discharge line 49. The response of the receiver antenna 140 varies with the position in which it is oriented with respect to the field pattern of the radiated signal 128. As a result, at any given point, there will be one orientation of the receiver antenna 140 at which the signal response will be a maximum and one orientation thereof at which the signal response will be a minimum.

The receiver antenna 140 is adjusted so as to be either parallel or normal to the axis of the arm 141 of the receiver 133. Thus, in order to determine the path of the metallic discharge pipe line 49, the receiver antenna 140 is positioned perpendicular to the arm 141, that is, it is positioned to be parallel to the surface of the ground. Then, as the operator slowly moves the receiver 133 across the approximate path of the discharge line 49, each time the receiver antenna 140 is directly above the discharge line it will pass a point of minimum response, i.e., a null point in the radiation pattern. By noting the path along which two or more such null points occur, the operator quickly finds the course along which the metallic discharge line is laid.

To locate the exact position along the path of the metal discharge line 49 that the transmitter antenna 58 has advanced, the receiver antenna 140 is set parallel to the arm 141 of the receiver 133, that is, the receiver 140 is position perpendicular to the surface of the ground. Then as the operator moves the receiver antenna 140 forward along, or closely parallel to, the path of the discharge line 49, the receiver 133 will emit a varying audio tone until it crosses a null point which is along a line normal to the center of the antenna transmitter 58. Thus each time the receiver antenna 140 crosses over such a line, the receiver 133 will pass through a point of minimum response, i.e., a null point. It should be noted that if the metallic discharge line 49 terminates by entering into a clay pipe, the operator can immediately detect this condition by the reduction in power drawn as indicated by the meter 29.

To measure the depth of the transmitter antenna 58, and, therefore, the depth of the discharge line 49, the mode selection switch 27 is set to fixed frequency operation and the rotation of the cable 39 is stopped by turning off the motor 34. For this particular operation, as shown in FIG. 12, the receiver antenna 140 is adjusted to be perpendicular to the arm 141, and the receiver 133 is placed above the location of the transmitter antenna 58 with the longitudinal axis of its receiver antenna 140 aligned parallel with the longitudinal axis of the transmitter antenna 58. The receiver antenna 140 is then moved by the operator in one direction longitudinally relative to the transmitter antenna 58 until a minimum or null response point is reached. The receiver 133 is then moved in the opposite direction longitudinally relative to the transmitter antenna 58 until a minimum or null response is again reached. By measuring the horizontal distance $dl$ between the two minimum or null response points and using information previously prepared based on the radiation characteristics of the transmitter antenna for 800 Hz signals, the depth $d2$ of the discharge line 49 below the surface of the earth can be readily determined.

A modified version of the electrical circuit associated with the transmitter antenna 90 embodiment is shown in FIG. 14. Thus, in this embodiment, the metallic sheath of the cable 39 is used to provide a third conductor, together with wires 56 and 57, along the length thereof. Thus, in FIG. 14, the conductors for connecting the output of the secondary winding 123 of transformer 122 to the coil 93 of the transmitter antenna 90 includes wire 39a connected to the cable 39 and the wire 56 extending through the cable 39. The other wire 57 extending through the cable 39 and the cable itself provide conductors for connecting a thermistor 126 on the free end of the cable 39 into a bridge circuit 130. The thermistor 126 is thus connected by wire 57 and a wire 39b, which latter is connected to the cable 39, to form one side of the bridge circuit 130 whose other sides are comprised of resistors R6, R7, and R8. The bridge circuit 130 is preferably adapted to be included in the box 21 on the reel drive 12. A 12 volt supply is connected across one of the set of opposing terminals 131 and 132 of the bridge circuit 130 and an output circuit is connected across the other set of opposite terminals 134 and 135 of the bridge circuit. A double-throw double-pole switch 138 connects either the output of the transformer 122 or the output of the bridge circuit 130 across the meter 29.

The purpose of the embodiment shown in FIG. 4 is to enable a determination to be quickly made of where a drain line 139, as shown in FIG. 15, feeds into a metal discharge line 143 in which the transmitter antenna 90 on the end of cable 39 is to be advanced. To accomplish this, the switch 138 is set so as to disconnect the coil 93 of the transmitter antenna 90 and connect instead the associated thermistor 126 across the meter 29. Hot water may then be caused to flow into the drain line 139. The cable 39 with the thermistor 126 on the end thereof is then inserted into the discharge line 143 until the meter 29 indicates that the thermistor 126 on the end of the cable 39 has advanced into the region of the discharge line 143 where the hot water is being fed in from the drain line 139. The switch 138 can then be set to connect the transformer 123 to the transmitter antenna 90 so that the underground location of the transmitter antenna 90 and, therefore, the location of the joint of the drain line 139 and the discharge line 143 can be determined.

While the invention has been illustrated and described in detail in the drawings and foregoing description, the same is considered to be illustrative and not restrictive in character, it being understood that only the preferred embodiments have been shown and described herein and that all changes and modifications that come within the spirit of the invention are also desired to be protected.

What is claimed is:

1. An electronic locator for tracing the course of a metallic discharge line which is disposed below ground comprising:

reel means having a frame, said reel means storing a length of flexible, hollow cable operable when rotated to drive the free end of the cable into said metallic discharge line, An audio frequency signal generator to generate a signal of less than about 800 Hz located on said frame and in which said audio frequency signal generated by said generator has a frequency periodically varying in the range of about 400 to about 800 Hz, a transmitter antenna attached to the free end of the cable, conductors extending through said cable for electrically connecting said audio frequency signal generator to said transmitter antenna, and a directional receiver means for detecting the audio frequency signals generated by said audio frequency signal generator and radiated by said transmitter antenna.

2. The invention in accordance with claim 1 including:

a thermistor attached to the transmitter antenna, and a bridge circuit on the frame of the real means, wherein the audio frequency generator is connected by one of said conductors and the cable itself to the transmitter antenna, and wherein the thermistor is connected by another of said conductors and the cable itself to form one side of said bridge circuit.

3. The invention in accordance with claim 1 including means for converting said audio frequency signals received by said directional receiver means to a corresponding audible tone.

4. An audio frequency generator circuit for an electronic locator used for tracing the course of a metallic discharge line which is disposed below ground, said audio frequency signal generator circuit being connected by conductors extending through a length of hollow flexible cable to a transmitter antenna which is inserted by the cable into the metallic discharge line and operates to radiate the audio frequency signal generated by said circuit, said circuit including:

an oscillator for providing periodic pulses, means responsive to said periodic pulses to provide square wave pulses, means for converting said square wave pulses to sawtooth pulses, a voltage controlled oscillator operable in response to the slopes of said sawtooth pulses to provide varying audio frequency signals of frequency less than about 800 Hz, a gating means for gating said audio frequency signals, means responsive to said periodic pulses for momentary closing said gating means, means for amplifying said audio frequency signals, and a current transformer for coupling the audio frequency signals via said conductors to said transmitter antenna.

5. The invention in accordance with claim 4 wherein said sawtooth pulses provide for controlling said voltage controlled oscillator whereby during each cycle of said sawtooth pulse the frequency of the audio frequency signals generated varies from approximately 400 Hz to 800 Hz and then back down to 400 Hz.

6. An apparatus for tracing the course of metallic pipe comprising an electrical signal generator, an electromagnetic signal radiator coupled to said signal generator, means to introduce and advance said signal radiator through metallic pipe, means including said signal generator to generate an oscillatory electrical signal of not more than about 800 Hz electrical conductor connecting said generator to said electromagnetic signal radiator, and means positioned externally of said pipe to detect the electromagnetic signal radiated through said pipe at an effective intensity to be detected by said last named means, and means to periodically modulate said signal to vary the frequency of said signal.

7. The apparatus of claim 6 in which said means to periodically modulate said signal includes means to form a series of spaced pulses in which the frequency in said pulses is not more than about 800 Hz.

8. The apparatus of claim 7 in which said frequency in said pulses varies in the range of about 400 to about 800 Hz.

9. The apparatus of claim 6, a temperature responsive device mechanically connected to said radiator, means including said device to detect the change in temperature to which said device is responsive.

10. An apparatus for tracing the course of metallic pipe comprising an electrical signal generator, a signal radiator coupled to said signal generator, means to advance said signal generator through metallic pipe, means including said signal generator to generate pulses of an oscillatory electricl signal of not more than about 800 Hz, electrical conductor connecting said generator to said radiator, and means positioned externally of said pipe to detect the generated signal in which the frequency of a preceding pulse increases in frequency followed by a pulse in which the frequency decreases.

11. The apparatus of claim 10 in which the pulses vary in frequency from about 400 Hz to about 800 Hz followed by a pulse in which the frequency decreases from 800 to 400 Hz.

12. A method for tracing the course of metallic pipe in the ground which comprises introducing an electromagnetic radiating device into the pipe, generating an electromagnetic oscillating signal of periodically varying frequency of less than about 800 Hz and transmitting said signal to said radiating device, electromagnetically radiating said signal in a predetermined pattern, positioning a receiving antenna above the ground and pipe for reception of said radiated signal and moving the antenna to a position where the received signal is at a minimum intensity in a null point of said pattern.

13. The method of claim 12 in which said radiated signal in each pulse is of a frequency in the range of about 400 Hz to about 800 Hz.

14. The method of claim 12 modulating the frequency of said radiated signal to vary the frequency in a series of pulses each varying in frequency in the range from about 400 to about 800 Hz.

15. The method of claim 14 in which said modulation increases the frequency from about 400 to about 800 Hz and then from about 800 to about 400 Hz in a series of spaced pulses.

16. An audio frequency generator circuit for an electronic locator used for tracing the course of a metallic discharge line which is disposed below ground, said audio frequency signal generator circuit being connected by conductors to a transmitter antenna which is inserted by the cable into the metallic discharge line and operates to radiate the audio frequency signal generated by said circuit, said circuit including:

an oscillator for providing periodic pulses, means responsive to said periodic pulses to provide square wave pulses, means for converting said square wave pulses to sawtooth pulses, a voltage controlled oscillator operable in response to the slopes of said sawtooth pulses to provide varying audio frequency signals of frequency less than about 800 Hz, a gating means for gating said audio frequency signals, means responsive to said periodic pulses for momentary closing said gating means, means for amplifying said audio frequency signals, and a current transformer for coupling the audio frequency signals via said conductors to said transmitter antenna.

* * * * *